United States Patent Office 3,335,134
Patented Aug. 8, 1967

---

3,335,134
CERTAIN 3,4-DIHYDROFLUORENO[1,9a,9-e,f]1,4-DIAZEPIN-3(2H)-ONES
Albert J. Frey, Essex Fells, and Hans Ott, Convent Station, N.J., assignors to Sandoz Inc., Hanover, N.J.
No Drawing. Filed June 10, 1965, Ser. No. 463,039
3 Claims. (Cl. 260—239.3)

This application is a continuation-in-part of application Ser. No. 356,977, filed Apr. 2, 1964.
This invention provides two classes of compounds which are structurally represented by Formulae I:

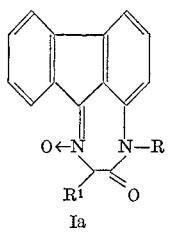 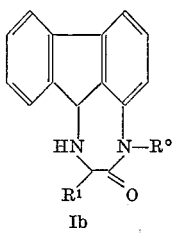

Ia                Ib wherein

R is either lower alkenyl having a saturated α-carbon atom, e.g., allyl; lower alkinyl having a saturated α-carbon atom, e.g. propargyl; or $R^0$;

$R^0$ is either lower alkyl (preferably having from 1 to 4 carbon atoms), e.g. methyl, ethyl, isopropyl and butyl; or a hydrogen atom (—H); and $R^1$ is either a hydrogen atom (—H) or lower alkyl having from 1 to 4 carbon atoms.

Compounds Ia and Ib are prepared from starting materials which are either well known or which are themselves prepared from readily available compounds according to procedures which are apparent to the art skilled. The general procedures for obtaining Compounds I are outlined in (A) to (D), which follow:

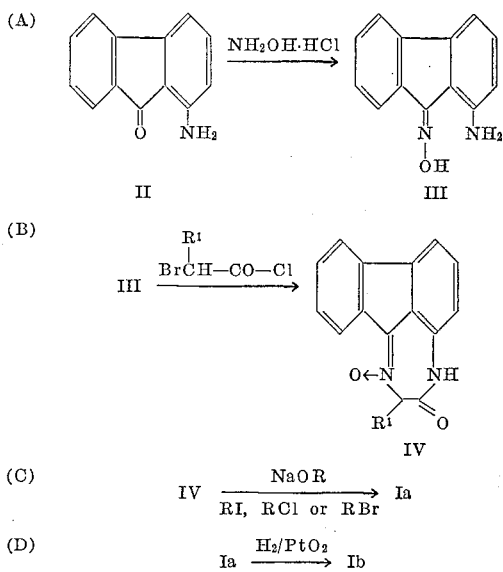

This route through the oxime III produces the N-oxides IV, which is sufficiently stable to introduce substituents, R, on the secondary amino nitrogen atom according to reaction (C). Both the thus-substituted and the unsubstituted (IV) N-oxides are converted to Ib according to reaction (D).

Reactions (A) to (C) are general reactions which are used for each of the contemplated meanings of R and $R^1$. For reaction (D) R should be $R^0$.

Compounds Ia and Ib are useful as anti-inflammatories.

Although dosage may vary somewhat from compound to compound and may also depend upon the severity of the condition being treated, suitable dosages are within the range of from 50 milligrams to 500 milligrams per day. Compounds I are administered either orally or parenterally in standard dosage forms, e.g. tablets and capsules.

Each of the pharmaceutically active compounds of this invention may be, e.g. incorporated for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant; e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well known in the art, employing the necessary amounts of conventional granulating liquids, e.g. alcohol SD–30 and purified water. An exemplary tabletting formulation for the instant active compound is:

| | Parts |
|---|---|
| Title compound of Example 2 | 85 |
| Tragacanth | 2 |
| Lactose | 4.5 |
| Corn Starch | 5 |
| Talcum | 3 |
| Magnesium stearate | 0.5 |
| Alcohol SD–30; purified water, q.s. | |

In the examples the parts and percentages are by weight, unless otherwise stated, and the temperatures are in degrees Centigrade. The relationship between parts by weight and parts by volume is the same as that between the kilogram and the liter.

EXAMPLE 1

1-amino-9-fluorenone oxime

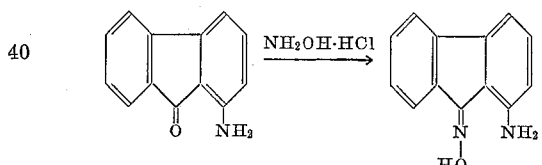

Dissolve 1 parts of 1-amino-9-fluorenone and 1 part of hydroxylamine hydrochloride in a mixture of 5 parts of ethanol and 5 parts of pyridine. Reflux the thus-produced solution for two hours. Thereafter add water to the reaction mixture to precipitate the title compound as yellow needles.

EXAMPLE 2

3,4-dihydrofluoreno[1,9a,9-e,f]1,4-diazepin-3(2H)-one-1-oxide

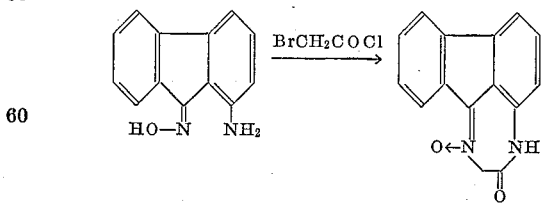

Dissolve 1 parts of 1-amino-9-fluorenone oxime (title compound of Example 1) in 20 parts of dioxane. Add dropwise (within a period of fifteen minutes) to the resulting solution 0.8 part of bromoacetylchloride at a temperature of from 10° to 20°. Thereafter slowly add to the product three equivalents of sodium hydroxide (in the form of a 10% aqueous solution) to precipitate the tetracyclic title compound as yellow prisms.

EXAMPLE 3

4-methyl-3,4-dihydrofluoreno[1,9a,9-e,f]1,4-diazepin-3(2H)-one-1-oxide

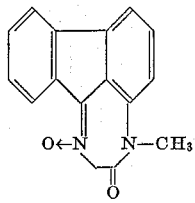

Dissolve 2.4 parts (1 mole) of the title compound of Example 2 in 50 parts of methanol. Add 0.6 part (1.1 mole) of sodium methoxide in methanol to the obtained solution. Evaporate the product to dryness.

Dissolve the residue (sodium salt) in 15 parts of DMF. add 1.5 parts of methyl iodide dropwise to the resultant DMF solution over a period of twenty minutes. Thereafter add water to precipitate the title compound. Recrystallize from absolute ethanol.

Replacing the methyl iodide by an equivalent of either allyl bromide or propargyl bromide results in the preparation, in similar manner, of the corresponding Compound Ia.

EXAMPLE 4

4-ethyl-3,4-dihydrofluoreno[1,9a,9-e,f]1,4-diazepin-3(2H)-one-1-oxide

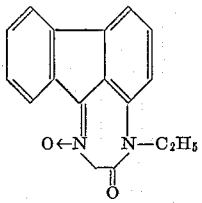

At room temperature add 1.2 parts by volume of 50% sodium hydride in mineral oil to 5 parts of the title compound of Example 2, dissolved in 100 parts by volume of dimethylformamide (DMF). Stir the obtained mixture for 15 minutes. Then heat same to 80° before adding thereto (within a period of from 5 to 10 minutes) a solution of 4 parts by volume of ethyl iodide in 50 parts by volume of DMF. Thereafter add water to the obtained product to precipitate the title compound. Recrystallize from ethyl acetate to obtain 2.9 parts of title compound, melting point (M.P.) 195°.

EXAMPLE 5

2-methyl-3,4-dihydrofluoreno[1,9a,9-e,f]1,4-diazepin-3(2H)-one-1-oxide

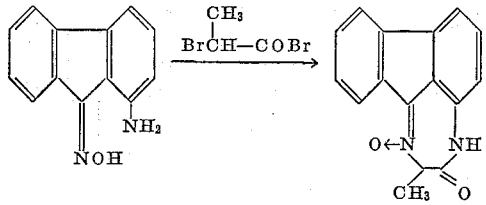

Within a period of two minutes and at 10° under stirring, add 6.5 parts by volume of α-bromopropionylbromide to a solution of 10 parts of the title compound of Example 1 in 160 parts by volume of dioxane and 16 parts by volume of water. Stir the obtained mixture for an additional 3 minutes before adding thereto 160 parts by volume of 1 N sodium hydroxide. Continue stirring for 10 minutes. Add water slowly to the obtained clear solution until said solution becomes cloudy; then acidify same with 2 N hydrochloric acid. Filter off the resulting precipitate and dry same. Recrystallize the title compound (precipitate), M.P. 226°, from ethanol.

EXAMPLE 6

2,4-dimethyl-3,4-dihydrofluoreno[1,9a,9-e,f]1,4-diazepin-3(2H)-one-1-oxide

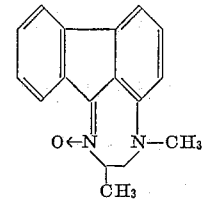

Dissolve 5.4 parts of the title compound of Example 5 in 100 parts by volume of DMF. Add at room temperature to the obtained solution 1.1 part by volume of 50% sodium hydride in mineral oil and stir the resulting mixture for 15 minutes. Heat the obtained product to 80° and add thereto a solution of 15 parts by volume of methyl iodide in 50 parts of DMF over a period of 5 to 10 minutes. Thereafter, add water to precipitate the title compound. Recrystallize from ethyl acetate to obtain 5.5 parts of said title compound, M.P. 227°.

EXAMPLE 7

1,2,3,4-tetrahydrofluoreno[1,9a,9-e,f]1,4-diazepin-3-one

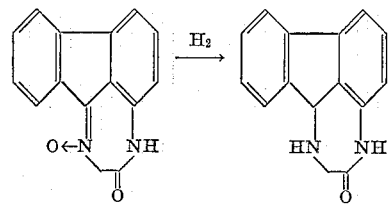

Add 2.5 parts of Raney nickel catalyst to a solution of 2.5 parts of the title compound of Example 2 in 80 parts by volume of dioxane. Shake the resultant in a hydrogen atmosphere until no further hydrogen uptake is observed. Filter off the catalyst. Evaporate the filtrate to dryness. Crystallize the residue (title compound), M.P. 274° to 275°, from methanol.

In the same manner all Compounds Ib are prepared from their corresponding Compounds Ia.

This invention will be understood from the foregoing description. Various changes may be made in the structures and processes without departing from the spirit and scope of the invention. The examples merely provide illustrative embodiments.

What is claimed is:

1. A compound of the formula

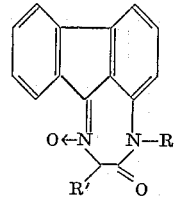

wherein

R represents lower alkynyl having a saturated α-carbon atom; and

R' represents hydrogen or lower alkyl.

2. A compound of the formula

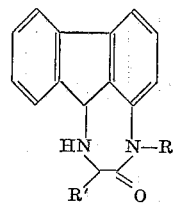

wherein

R represents lower alkynyl having a saturated α-carbon atom; and

R' represents hydrogen or lower alkyl.

3. 4-propargyl - 3,4 - dihydrofluoreno[1,9a,9-e,f]1,4-diazepin-3(2H)-one-1-oxide.

No references cited.

WALTER A. MODANCE, *Primary Examiner.*

ROBERT T. BOND, *Assistant Examiner.*